United States Patent Office 3,467,502
Patented Sept. 16, 1969

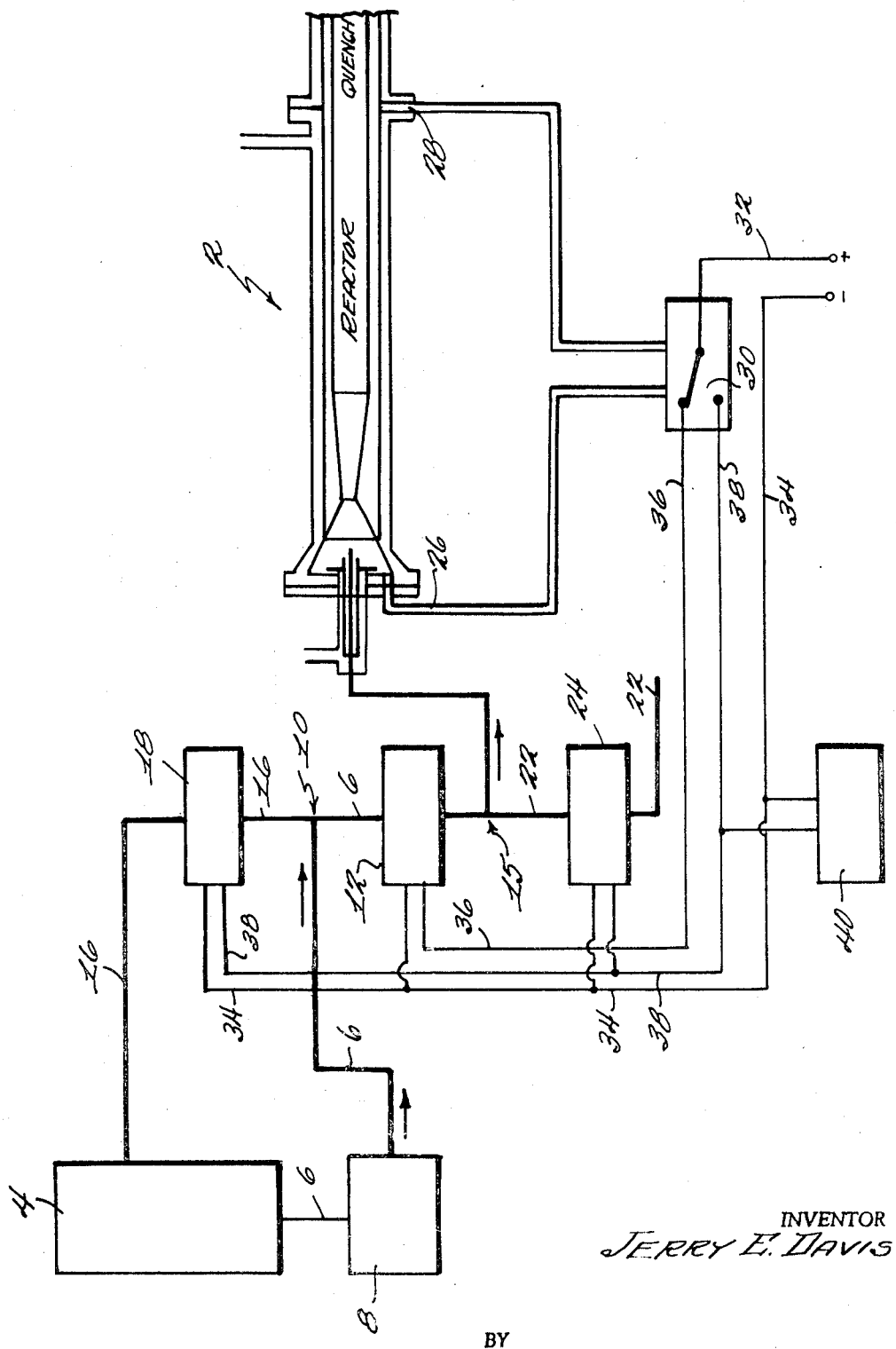

3,467,502
FEEDSTOCK CONTROL SYSTEM FOR CARBON BLACK REACTORS
Jerry E. Davis, Dumas, Tex., assignor to Continental Carbon Company, Houston, Tex., a corporation of Delaware
Filed Oct. 12, 1966, Ser. No. 586,273
Int. Cl. C09c 1/48; F23n 1/00, 5/24
U.S. Cl. 23—259.5                        3 Claims

ABSTRACT OF THE DISCLOSURE

Control apparatus for a carbon black reactor comprising means for measuring the pressure in the reactor upstream and downstream of the effluent forming area, and means for continuing or discontinuing the flow of feedstock of a reservoir into the reactor on the basis of the pressure measurements as related to predetermined pressure conditions. The occurrence of a pressure differential greater than predetermined limit, in the event of a reactor obstruction such as coke buildup, activates means to suspend feedstock introduction until such time as the pressure differential is reduced within the limit again at which point the feedstock is again introduced to the reactor.

---

This invention relates to the production of carbon black by cracking liquid hydrocarbon feedstock introduced in an atomized or vaporous form within a reactor or furnace in the presence of flame and combustion gases resulting from the combustion of a suitable fuel and air for dissociation of the feedstock to carbon black and other components; and more particularly, to the controlling of the supply of such feedstock to the reactor or furnace in accordance with certain operating conditions there within.

It is, of course, well known that carbon black processes of the type generally described may be carried out in furnaces or reactors which vary as to design and construction; and this is also true with respect to the manner in which the hydrocarbon feedstock and the combustion fuel and air are supplied to the furnace or reactor.

However, in all such processes, the effluent gas from the reactor or furnace contains carbon black in suspension which is conducted to and through a quench unit or section, and thereafter to collection and separation equipment for recovery of the carbon black from the suspending gas for subsequent processing as a final product.

The production of carbon black from liquid hydrocarbon feedstock in a reactor represents a great improvement over the prior means used; however, the use of such reactors is not without certain operating difficulties. One of the most common problems in the manufacture of carbon black in such a manner is the occurrence of coking in the reactor which involves the undesirable deposition of coke or other carbonaceous obstructions on the interior of the reactor or equipment therein, such as the burner apparatus. The causes of coking in a reactor are numerous, such as feedstock quality, pyrolysis and flow conditions, burner alignment, and the like; and, the point is that it represents a problem that will not be completely eliminated from commercial operations.

The occurrence of reactor coking results in the production of carbon black that does not meet quality specifications, and further, the coke deposit substantially reduces the efficiency and throughput for the reactor. In the event the coking situation is persistent, the reactor downtime for coke removal with resultant loss of production will be substantial, and the maintenance and replacement expenses for the reactors increases.

Heretofore, the determination of reactor coking was made by visual observation or upon the occurrence of a buildup of coke in sufficient quantity as to practically plug the reactor completely. Visual observation is highly unsatisfactory because of the inability to sight into a reactor during operation and accurately inspect for the existence of coke deposition, so reactor coking is not determined until the amount of buildup is excessive.

After determination of coking is made, the only practical means of removing the coke buildup is by high temperature oxidation. This is achieved by terminating the introduction of feedstock to the reactor while continuing the introduction of fuel and air to the reactor, thus permitting the normal fuel-air combustion to take place since the air-to-fuel ratio is normally sufficient to furnish the requisite excess oxygen. The application of the combustion conditions within the reactor without feedstock oil injection causes the coke to be oxidized or burned out of the reactor whereupon, production can then be commenced again. The amount of coke deposit controls the time required for coke removal, so as the coke buildup becomes greater, the time to burn out also is greatly increased.

Accordingly, a principal object of the present invention is to provide a system for the early detection of the occurrence of coke or carbonaceous deposit within a reactor for carbon black production.

A further object of the present invention is to provide a system which automatically removes coke deposit by discontinuance of the supply of feedstock to the carbon black reactor or furnace, application of high temperature oxidation for coke burnout, together with automatic resumption of the supply of feedstock when said coke is removed.

Another object is the provision of a system of the type described which does not affect the supply to the reactor or furnace of combustion fuel and combustion air; that is, the operation of the reactor continues under heat load during the time the supply of hydrocarbon feedstock is discontinued and pending the return of operating pressures to normal. The operation of the reactor under heat load, in the absence of the liquid hydrocarbon feedstock, and in accordance with the techniques described hereinafter, practically invariably accomplishes the removal of the coke or other undesirable obstruction and return to normal operating conditions in minimum time and production losses and at minimum expense.

Still another object is the attainment of the aforementioned advantages with an apparatus which is utilizable on carbon black reactors or furnaces of existing construction; and, one which is, at the same time, relatively simple and inexpensive to manufacture, install and maintain.

The foregoing and further objects and advantages of the present invention will be more fully understood from the following description and annexed drawing, wherein like reference characters designate like parts.

In the drawing, the figure is a schematic diagram illustrating a form of apparatus which may be utilized to practice the method of the invention.

Broadly, the present invention is directed to a feedstock control apparatus for use in conjunction with a carbon black reactor including a burner and feedstock injector which comprises a reservoir for the feedstock to be fed to the carbon black reactor, means for measuring the pressure in the carbon black reactor both upstream and downstream with respect to the effluent forming area thereof, means operable by said measuring means upon predetermined pressure conditions to permit the flow of feedstock from said reservoir to the carbon black reactor, means operable by said measuring means upon deviation from said predetermined pressure conditions to discontinue the flow of feedstock from said reservoir to the carbon black reactor; and means operable by said measuring means to permit the resumption of flow of feedstock from said reservoir to the carbon black reactor upon return to the predetermined pressure conditions.

Referring more particularly to the figure, the numeral 2 generally designates a carbon black furnace or reactor which may take any of a number of different forms but which, in the present instance, is shown as comprising:

an elongate metallic housing having a main body portion of cylindrical cross-section provided at one end with a frusto-conically flared extension having a centrally apertured cover plate;
an air inlet adjacent the other end of said housing;
an elongate cylindrical metallic casing disposed concentrically within the main body portion of said housing;
a refractory lining in said casing;
said refractory lining providing a Venturi passage relatively adjacent the frusto-conically flared extension of said housing;
a quench unit or section communicating with the interior of the refractory lining at its end which is remote from the Venturi passage provided thereby;
a first elongate metallic tube extending at one end through the central opening in said closure plate and projecting into the area defined by the frusto-conically flared extension of said housing;
a metallic disc of substantially larger diameter secured to the aforementioned end of said elongate metallic tube;
said elongate metallic tube having a plurality of radially disposed apertures immediately behind said disc;
a second elongate metallic tube disposed concentrically in said first elongate metallic tube and extending through and projecting from the central aperture in said disc;
a third elongate metallic tube disposed concentrically in said second elongate metallic tube and carrying a spray head on its end which is most adjacent said disc;
means for supplying combustion fuel to the interior of said first elongate metallic tube;
means for supplying combustion air to the interior of said second elongate metallic tube;
means for supplying liquid hydrocarbon feedstock to the interior of said third elongate metallic tube;
a frusto-conical shield having its smaller end communicating with the interior of the refractory lining of said casing; and
a circular plate closing the larger end of said frusto-conical shield and having a central opening therein for disposition over and around the adjacent end of said second elongate metallic tube;
the sidewalls of said frusto-conical shield being apertured to permit the flow thereinto of air which is introduced from said air inlet to the space between the interior of said housing and the exterior of the casing which is disposed concentrically therein.

The carbon black reactor or furnace 2, of the type described immediately hereinbefore, is known in the carbon black industry, and as such, it forms no part of the present invention. However, the system of the invention has been applied to, and very effectively demonstrated in connection with, this particular type of carbon black reactor.

As shown in the annexed schematic diagram, an oil supply tank 4 contains a liquid hydrocarbon feedstock to be cracked in the carbon black reactor; and the line 6 which supplies said feedstock from said oil supply tank is directed to and through a pump 8 to a T connector 10. One arm of this T 10 continues the feedstock line 6 through a conventional and normally closed solenoid valve 12 to a T connector 15; and the leg of the T 15 is connected to the centrally disposed feedstock tube of the hereinbefore described burner and injection assembly of the carbon black reactor 2.

The arm of the T connector 10 which is oppositely disposed with respect to the solenoid valve 12 is connected to to a feedstock return line 16 which continues through a conventional and normally closed solenoid-actuated recirculation valve 18 to the oil supply tank 4.

The arm of the T connector 15 which is oppositely disposed with respect to the solenoid valve 12 is connected to an air purge line 22, which contains a conventional and normally closed solenoid-actuated valve 24 and extends to an air source not shown.

A pneumatic pressure line 26 communicates at one end with the interior of the frusto-conically flared extension of the elongate cylindrical metallic housing of the reactor; and a similar pneumatic pressure line 28 communicates at one end with the quench unit or section of the reactor; the ends of said pneumatic pressure lines communicating with a conventional differential pressure switch 30.

From the foregoing construction and arrangement, in the illustrated wiring diagram which includes positive line 32, ground line 34, lead 36 from the differential pressure switch 30 to valve 12, and lead 38 from the differential pressure switch 30 to valves 18 and 24.

Another, but optional, feature of the invention includes an alarm system, generally indicated at 40 tied into the circuit of ground line 34 and lead 38, which may include audible or visible signaling elements or a combination thereof; for example, a horn and/or signal light.

Operation of the apparatus of the above described system devolves from the operation of the differential pressure switch 30 responsive to the pressures in pneumatic pressure lines 26 and 28. Normal operation of reactor 2 creates a fairly constant pressure differential within the reactor as determined by measurements of pressure by line 26 just ahead of the burner in the upstream end of the reactor and by line 28 just ahead of the quench section in the downstream end of the reactor. The differential pressure switch 30 is preset on the desired maximum operating pressure differential after reviewing the differential pressure range with a manometer, or similar device, for a particular reactor operation and selecting the appropriate maximum. The pressures in the upstream end of the reactor exceed those in the downstream end in normal operations; however, the deposition of coke or other deposit intermediate of said ends further increases the pressure upstream and, upon exceeding the maximum desired pressure differential, switch 30 is activated.

The system operation illustrated in the figure provides for switch 30 to be in the position for normal operation of the reactor for production of carbon black with the active circuit being lines 32 and 36, the latter actuating valve 12 to pass feedstock from tank 4 through line 6, T connectors 10 and 15, and line 22 into reactor 2; while normally closed valves 18 and 24 are inactive.

The system operation provided by switch 30 upon reversing position from the figure occurs upon excessive pressure differential requiring reactor operation for coke removal by oxidation with the active circuit being lines 32 and 38, the latter actuating valves 18 and 24, while normally closed valve 12 is inactive. Consequently, the feedstock from tank 4 passes through line 6, T connector 10, valve 18, line 16 for recycling to tank 4; while air passes through line 22, valve 24 and T connector 15 to the burner assembly of reactor 2, purging the feedstock from the reactor and furnishing oxidation air. The alarm system 40 is also actuated by this circuit.

It will be observed that appropriate adjustment of the differential pressure switch 30 will result in the automatic discontinuance of the supply of liquid hydrocarbon feedstock to the reactor upon the occurrence of an undesirable relationship between upstream and downstream pressures within carbon black reactor 2, together with the automatic return of feedstock to the system when the coke is removed and the pressure differential has returned to an acceptable degree. Also, during the time the supply of feedstock is being withheld from the reactor, the feedstock injection tube of the burner and injector assembly is air purged through the air purge line 22 and the solenoid-actuated valve 24 which opens and shuts it as conditions require.

Having thus described my invention, what I believe to be novel and desire to secure by Letters Patent is:

1. Apparatus for controlling the supply of liquid hydrocarbon feedstock to carbon black reactors comprising, in combination, a feedstock reservoir;
a pump communicating with said reservoir;
a supply line connected to said pump;
a shut-off valve;
a recirculation valve;
a supply line connected to said pump and communicating with both said shut-off valve and said recirculating valve;
a line connecting said shut-off valve with the feedstock injector of said carbon black reactor;
a line connecting said recirculation valve with said reservoir;
means for measuring the pressure in said carbon black reactor both upstream and downstream with respect to the effluent-forming area thereof;
means operable by a predetermined dfferential pressure range in the effluent-forming area of said carbon black reactor to maintain said recirculation valve closed and said shut-off valve in open position to continue the flow of feedstock from said reservoir to the feedstock injector of said carbon black reactor; and
means operable by pressures varying from said predetermined differential pressure range to close said shut-off valve and open said recirculation valve to return the flow of feedstock to said reservoir.

2. The combination of claim 1, together with means operable upon return to pressures which are within said predetermined differential pressure range to close said recirculation valve and open said shut-off valve to permit the resumption of the flow of feedstock from said reservoir to the feedstock injector of said carbon black reactor.

3. The combination of claim 1, together with a purge line communicating with the feedstock injector of said carbon black reactor; a valve in said purge line; means operable by pressures within said predetermined pressure range to maintain said valve in closed position; and means operable by pressures varying from said predetermined differential pressure range to open said valve and purge the feedstock injector of said carbon black reactor.

References Cited
UNITED STATES PATENTS

| | | | |
|---|---|---|---|
| 1,097,196 | 5/1914 | Sperr | 202—241 |
| 2,785,960 | 3/1957 | Ribble et al. | 23—259.5 |
| 2,883,271 | 4/1959 | Pennington et al. | 23—259.5 |
| 2,886,567 | 5/1959 | Wood | 23—259.5 |
| 3,038,788 | 6/1962 | Pennington et al. | 23—259.5 |
| 3,165,522 | 1/1965 | Dye | 23—259.5 |

JAMES H. TAYMAN, Jr., Primary Examiner

U.S. Cl. X.R.

23—209.4, 209.6; 137—7; 208—48; 431—19, 3, 29, 37